Figure 1:
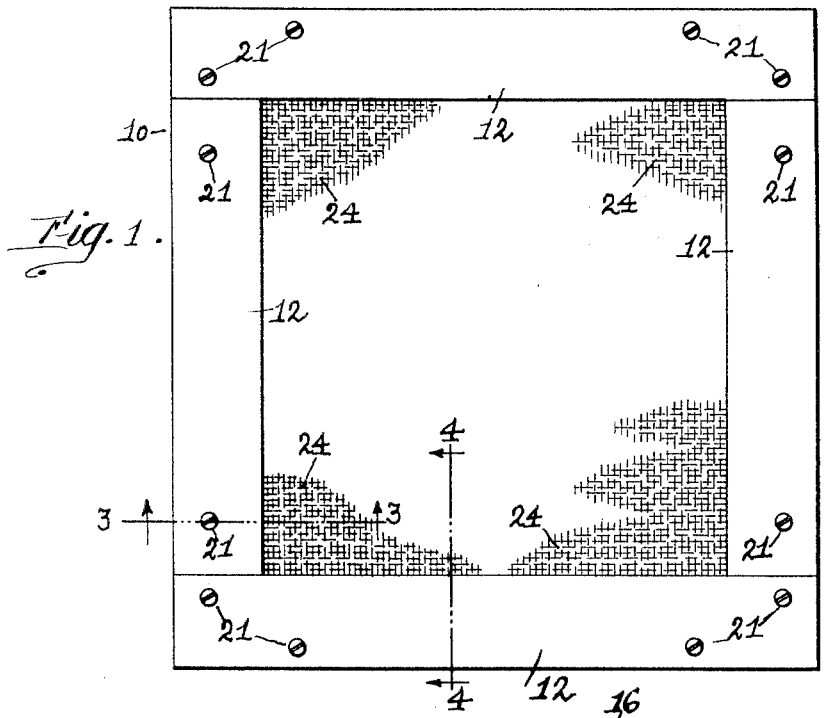

May 3, 1932.  E. B. FEASTER  1,856,323
WINDOW SCREEN
Filed Jan. 15, 1931  2 Sheets-Sheet 1

Inventor
Edward B. Feaster
by Jas. H. Churchill Atty.

May 3, 1932.  E. B. FEASTER  1,856,323
WINDOW SCREEN
Filed Jan. 15, 1931   2 Sheets-Sheet 2
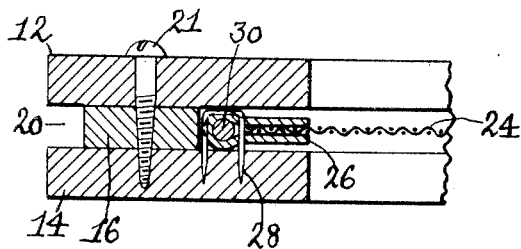
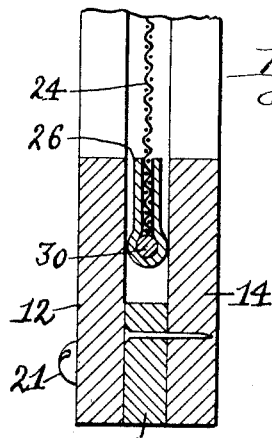
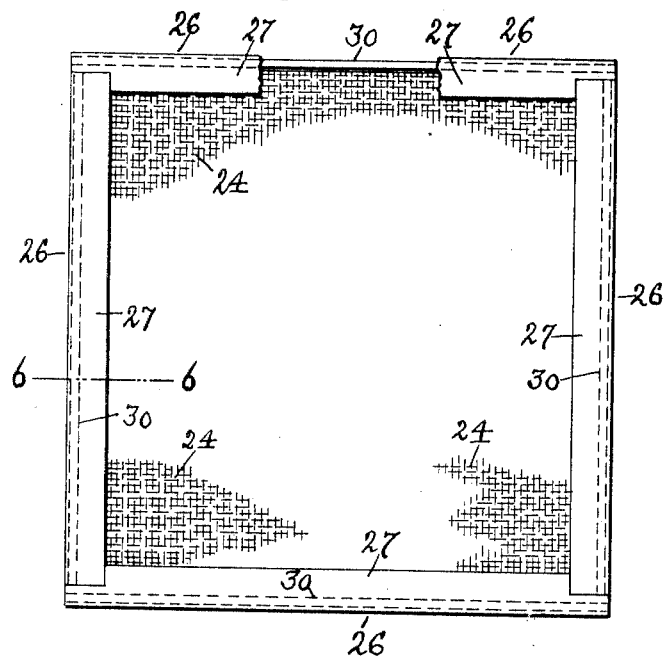
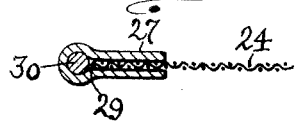
Inventor
Edward B. Feaster
by Jas. H. Churchill
Atty.

Patented May 3, 1932

1,856,323

UNITED STATES PATENT OFFICE

EDWARD B. FEASTER, OF WEST NEWTON, MASSACHUSETTS

WINDOW SCREEN

Application filed January 15, 1931. Serial No. 508,879.

This invention relates to a window screen.

The invention has for an object to provide a novel and highly efficient construction of window screen, which may be economically manufactured, and in which the screening is evenly mounted within an outer frame in a novel and superior manner, designed to prevent destruction of the screening when the latter is subjected to inadvertent blows, and also to permit the screening to be conveniently installed in the outer frame at a minimum expense.

With this general object in view and such others as may hereinafter appear, the invention consists in the window screen hereinafter described, and particularly pointed out in the claims at the end of this specification.

Figure 2:
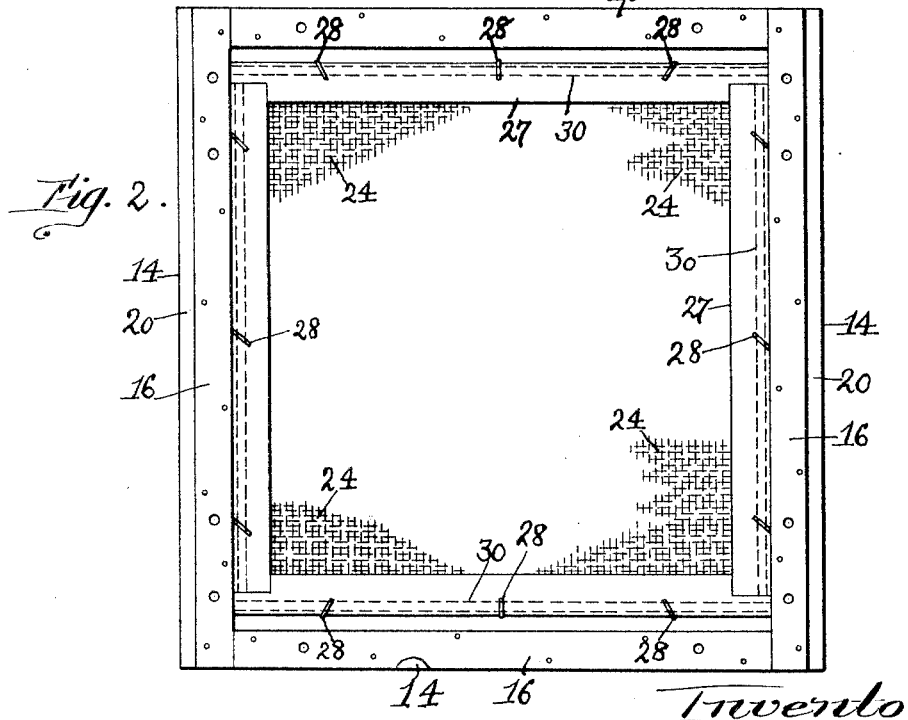

In the drawings illustrating the preferred embodiment of the invention,

Fig. 1 is a front elevation of the improved screen;

Fig. 2, a similar view with portions of the frame removed to illustrate the manner of mounting the screen in the frame;

Figs. 3 and 4, sectional details on the lines 3—3 and 4—4 of Fig. 1;

Fig. 5, a front elevation with a portion broken away of the screen ready for mounting within the frame; and Fig. 6, a detail in section on the line 6—6 of Fig. 5.

In general, the present invention contemplates a window screen constructed of an outer frame, which may be of wood, metal, or the like, provided with an improved screen unit mounted therein.

The screen unit may and preferably will comprise a screen member itself enclosed and mounted within a yieldable frame, preferably of rubber.

Provision is made for removably securing the screen unit within the frame by fastening devices co-operating with the yieldable frame to the end that the screen may be connected to the frame through the medium of the resilient or yieldable frame.

Provision is also preferably made for reinforcing the yieldable frame and for facilitating the mounting of the screen unit within the outer frame.

Referring to the drawings, 10 represents the outer frame which may be and is herein shown as formed by front and rear frames 12, 14, and interposed spacing strips 16 arranged at the sides of the outer frame to form a pair of grooves 20 for co-operating with the usual runners on the window sash to permit the screen to be slid up and down.

The members comprising the front frame may be removably secured to the rear frame 14 as by screws 21, as shown.

The outer frame 10 is provided with a screen unit removably mounted therein, and as herein shown a sheet of screening 24 is provided with a yieldable frame 26 extended around and secured to the periphery of the screening, and provision is made for securing the screening 24 in the rigid outer frame 10 by fastening devices 28 co-operating with the yieldable frame 26, whereby the screening may be yieldably secured to the wooden frame 10.

As best illustrated in Figs. 5 and 6, the sheet of screening 24 has cemented to the periphery thereof strips 27 of rubber which may be folded over the side edges 29 of the screening in the manner illustrated in Fig. 6.

The folded portion of each rubber strip preferably embraces a metal reinforcing rod 30, and in order to form a smooth joint at each corner of the yieldable frame, two of the opposed rubber strips are provided with cutaway portions into which the ends of the remaining two rubber strips are fitted, as illustrated in Fig. 5.

The unitary structure illustrated in Fig. 5 comprises the sheet of screening 24 mounted within a yieldable frame 26 cemented or otherwise secured to the entire periphery of the screening.

The screen unit may be assembled within the outer frame 10, and for this purpose the strips forming the front frame 12 may be removed by means of the screw 21 and the screen unit illustrated in Fig. 5 attached by means of staples 28 straddling the reinforcing rods 30 and driven down into the lower frame 12, as illustrated in Figs. 2 and 3. Thereafter the strips forming the front frame 12 may be replaced, and the relative widths of the yieldable frame and the front frame 14 are preferably such that in the complete screen, the yieldable frame is substantially concealed from view.

From the description thus far, it will be observed that in the illustrated window screen, the screening 24 itself is connected or secured to the surrounding outer frame by the yieldable frame, preferably of rubber, permitting a considerable amount of yielding action to take place in the event that the screen is subjected to pressure or blows of such character as would tend to cause the screening to be torn from its frame in the ordinary construction of window screen.

The fact that the yieldable frame is secured to the entire periphery of the screening contributes to the uniform distribution over the entire periphery of the screen of the strain when the screen is subjected to a blow, thereby assisting in preventing the screening from becoming permanently distorted and preventing the fasteners from being torn out, and enabling the yieldable frame to restore the screening to its original flat condition.

It has been found that the yieldable frame, particularly when provided with the reinforcing rods 30, makes it necessary to utilize only a relatively few staples or similar fastening devices for attaching the rubber frame to the surrounding wooden frame, whereas in the ordinary screen construction the screening itself is tacked by a large number of tacks spaced at short intervals apart. This feature of the invention contributes to facilitating the removal and installation of the screen unit in the outer frame.

The reinforcing rods also contribute to assist in maintaining the screening in a flat condition, imparting strength and additional reinforcement to the rubber frame, and afford a convenient anchor with which the staples or other fastening devices may co-operate in securely attaching the screen unit within the enclosing outer frame.

In the manufacture of the screen unit, the screening itself may have the yieldable strips secured to the lateral marginal edges of the screen during the manufacture of the screening, or in other words, as the screening is run out on the loom upon which it is woven.

Thereafter the individual screen sections with the rubber strips on the sides may be severed from the strip of screening thus produced, and then the two remaining yieldable strips may be secured to the screening, thus contributing to the economical manufacture of the screen unit.

The reinforcing rods may be conveniently slipped into the loops or folded-over portions of the yieldable strips, and then the screen unit assembled as above described, in the outer frame.

While the preferred embodiment of the invention has been illustrated and described, the invention may be embodied in other forms within the scope of the following claims.

Having thus described the invention, what is claimed is:

1. A window screen comprising an outer frame, a yieldable frame within the outer frame and secured thereto, and a sheet of screening within and secured to the yieldable frame to permit the screening to yield under pressure applied to it and to return said screening to its normal position when said pressure is removed.

2. A window screen comprising an outer frame, a screen unit removably secured within the outer frame comprising a sheet of screening having rubber strips cemented throughout their length to the top, bottom and side edges of the screening, co-operating to form in effect a yieldable frame within which the screening is mounted, reinforcing members for the rubber strips, and fastening devices co-operating with the reinforcing members for securing the screen unit within the outer frame.

3. A window screen comprising an outer frame, a screen unit removably secured within the outer frame comprising a sheet of screening having rubber strips cemented throughout their length to the top, bottom and side edges of the screening co-operating to form in effect a yieldable frame within which the screening is mounted, and fastening means for securing the yieldable frame to the outer frame.

4. A window screen comprising an outer frame, and a frame unit secured within the outer frame comprising a sheet of screening having a rubber strip extended along each edge of the screening and folded over the same, and fastening devices co-operating with the rubber strips for securing the screen unit within the outer frame beyond the edges of said screening to permit the latter when pressed upon to stretch the rubber strips and to enable the latter to return the screening to its normal flat condition when said pressure is removed.

5. A window screen comprising an outer frame, and a screen unit secured within the outer frame comprising a sheet of screening having a rubber strip folded over and extended longitudinally of each marginal edge of the screening and secured to the opposite surfaces thereof in fixed relation thereto throughout the length thereof, reinforcing members around which the rubber strip is folded, and fastening devices co-operating with the reinforcing members for securing the screen unit within the frame.

6. A window screen comprising an outer frame, and a screen unit secured within the outer frame, said unit comprising a sheet of screening, and yieldable means fastened to the outer frame and secured to the edges of the screening throughout the length thereof to permit the screening to yield under pressure applied to it and to return said screening to its normal position when said pressure is removed.

7. A window screen comprising an outer frame and a screen unit secured within the outer frame, said screen unit comprising a sheet of screening, and a yieldable frame within and to which the screening is secured throughout the periphery thereof, and fastening means co-operating with the yieldable frame and with the outer frame, said screening being capable of yielding under pressure applied to it and of returning to its normal position when said pressure is removed.

8. A window screen comprising an outer frame and a screen unit secured within the outer frame, said unit comprising a sheet of screening, a yieldable frame to which the sheet of screening is secured, reinforcing members for the yieldable frame, and fastening devices co-operating with the reinforcing members for securing the yieldable frame and screening to the outer frame, said screening being capable of yielding under pressure applied to it and of returning to its normal position when said pressure is removed.

9. A window screen comprising a wooden frame provided with removable facing members, a screen unit secured within the frame, and comprising a sheet of screening having a yieldable frame secured to its marginal portions, and fastening devices co-operating with the yieldable frame for securing it beyond said screening to the wooden frame, said fastening devices and yieldable frame underlying the removable facing members of the wooden frame.

10. A window screen comprising an outer frame, and a screen unit secured within the outer frame and yieldable with relation thereto under the influence of pressure applied to said screen unit and capable of being automatically returned to its normal position when said pressure is removed.

In testimony whereof, I have signed my name to this specification.

EDWARD B. FEASTER.